United States Patent

[11] 3,591,310

| [72] | Inventor | Rene Louis Mouille<br>Aix-en-Provence, France |
|---|---|---|
| [21] | Appl. No. | 837,539 |
| [22] | Filed | June 30, 1969 |
| [45] | Patented | July 6, 1971 |
| [73] | Assignee | Sud-Aviation Societe Nationale de<br>Constructions Aeronautiques<br>Paris, France |
| [32] | Priority | July 4, 1968 |
| [33] | | France |
| [31] | | 157831 |

[54] ARTICULATED HUB FOR HELICOPTER ROTOR
2 Claims, 2 Drawing Figs.

[52] U.S. Cl. .................................................. 416/107,
416/135, 416/140, 416/141, 416/244
[51] Int. Cl. ......................................................... B64c 27/38
[50] Field of Search........................................... 416/103-
-107, 134-141, 102, 148, 244, 131, 106

[56] References Cited
UNITED STATES PATENTS

| 2,672,941 | 3/1954 | Jovanovich | 416/103 |
|---|---|---|---|
| 2,719,593 | 10/1955 | Alex | 416/140 |
| 2,853,141 | 9/1958 | Leoni | 416/106 |
| 3,322,200 | 5/1967 | Tresch | 416/131 (X) |
| 3,470,962 | 10/1969 | Cure | 416/131 (UX) |
| 3,504,989 | 4/1970 | Kisovec | 416/135 (X) |

*Primary Examiner*—Everette A. Powell, Jr.
*Attorney*—Waters, Roditi, Schwartz & Niessen ABSTRACT: The present invention relates to a hollow, unit-construction mast-hub assembly having cylindrical arms at its top for supporting as many helicopter rotor blades through the medium of sleeves associated to said arms and pivotally mounted thereon, a flapping and lead-lag hinge device being interposed between each of said sleeves and a blade attachment clevis.

ARTICULATED HUB FOR HELICOPTER ROTOR

DESCRIPTION

The invention relates to an articulated hub for a helicopter rotor, consisting of an assembly comprising a system of lead-lag and flapping hinges capable of being adapted on cylindrical blade-supporting arms at the top of a hollow mast-hub unit.

The designs resorted to heretofore have involved a large number of parts of intricate shape which are complicated to assemble. In order to ensure adequate strength in such parts it has been necessary to make them out of high-tensile, high-density materials, notably steel, resulting in a hub of great weight.

Further, the space occupied by the various hinges has resulted in a bulky assembly generating strong aerodynamic drag detrimental to the obtainment of high forward speeds in a helicopter.

The present invention has for its object to overcome these drawbacks and to offset the flapping and lead-lag hinges as much as possible so as to assist rotor stability by combining a powered hollow mast-hub unit, made of aluminum for instance and carrying at its top as many blade-supporting cylindrical arms as there are blades, with as many sleeves rigid with said hub as there are arms, said sleeves each carrying lead-lag and flapping hinge means for the associated blade, on which means is articulated a blade-securing clevis.

Each cylindrical sleeve is rotatably mounted on the blade-supporting arm and is connected to a central corepiece housed in the top of the mast-hub through the agency of a long torsionally flexible tie member of any convenient type, such as a cluster of steel blades designed to transmit to said corepiece the centrifugal loads caused by rotation of the blades while at the same time permitting angular movement of the sleeve relatively to the arm.

A substantially vertical lead-lag pivot is rotatably supported by two clevis branches formed at the blade end of the sleeve and has extending through it at right angles a flapping pivot about which is articulated the blade attachment clevis.

At one of its ends the flapping pivot receives a hydraulic lead-lag motion damper.

The blade attachment clevis comprises a spring-loaded catch which upon being subjected to centrifugal force during rotation of the rotor retracts and permits upward angular motion of the blade.

The description which follows with reference to the accompanying nonlimitative exemplary drawing will give a clear understanding of how the invention can be carried into practice.

Figure 1:
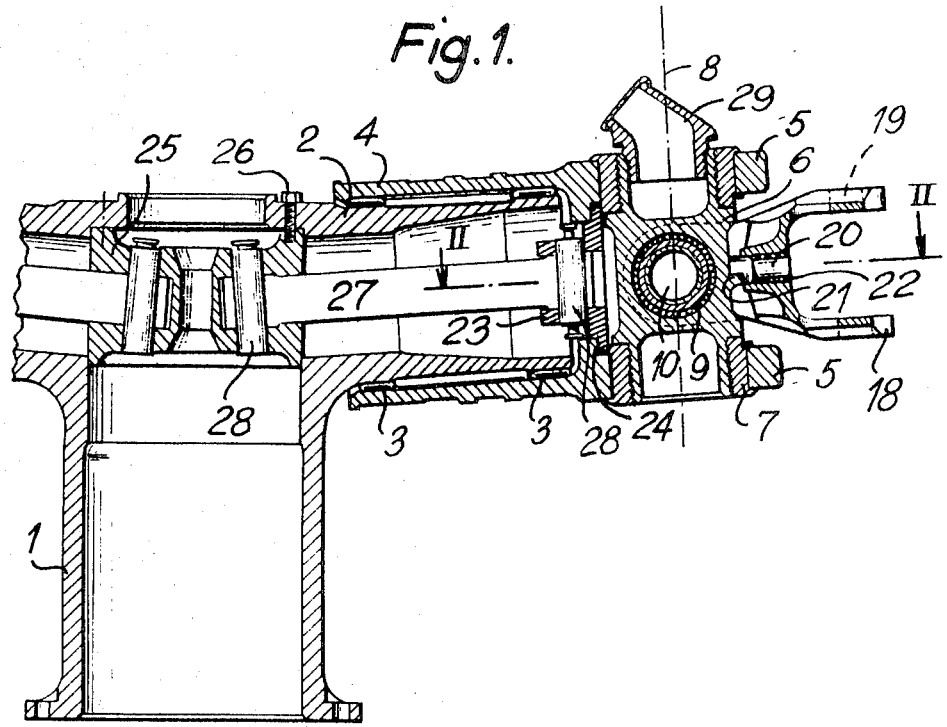
FIG. 1 is a fragmental section taken through a radial plane of the mast-hub unit, showing the hub and the blade hinges.
Figure 2:
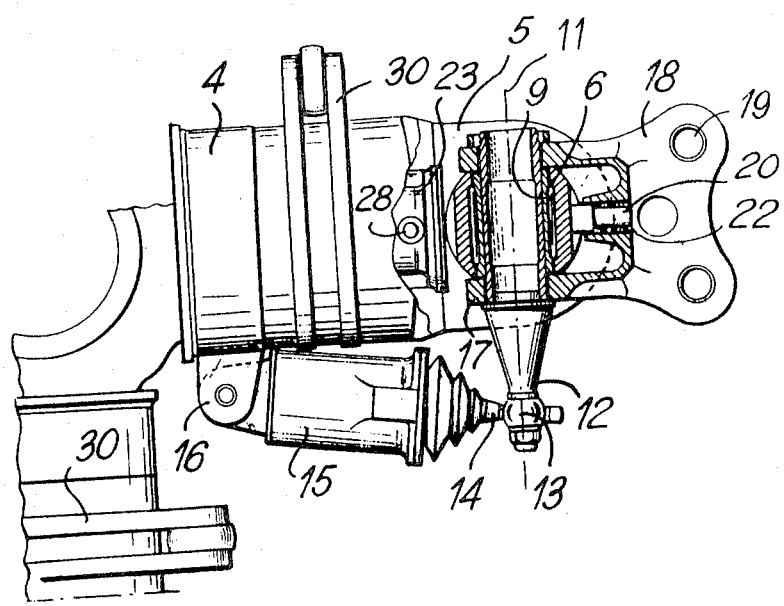
FIG. 2 is a fragmental section taken through II–II of FIG. 1.

As shown in FIG. 1, a unit-construction mast-hub 1 terminates at its top in cylindrical, hollow, blade-supporting arms 2. Mounted on these supporting arms 2, on needle bearings 3, are cylindrical sleeves 4. The end of each sleeve proximate the blade is U-shaped and forms a clevis 5 for a lead-lag pivot 6 which is supported therein through the medium of two plain bearings or two needle bearings 7. The axis 8 of lead-lag pivot 6 lies in a vertical plane and is perpendicular to the axis of blade-supporting arm 2. Pivot 6 is freely rotatable about axis 8 and allows angular motion of the blade in its plane of rotation.

The middle of pivot 6 is formed with a bore housing needle bearings 9 through which is rotatably supported a flapping pivot 10 having its axis 11 perpendicular to axis 8. Flapping pivot 10 is extended at one end by a lever-forming cone 12 terminating in a ball-and-socket joint 13 which provides a connection with the rod 14 of a hydraulic lead-lag motion damper whose cylinder 15 is restrained on sleeve 4 by means of a yoke 16. Pivot 10 is fixed between the two branches 17 of the blade attachment clevis 18, and this clevis is formed at its blade end with four cylindrical bores 19 for receiving the two blade-supporting pins. Clevis 18 is furthermore provided in its middle with a retractable stop 20 for limiting downward angular motion of the blade. Stop 20 is formed by a cylindrical catch capable of sliding in a likewise cylindrical lodging formed in clevis 18, which catch is adapted to bear against a ridge 21 on pivot 6. Catch 20 is maintained in pressure contact against ridge 21 by a spring 22 of strength such that, when the rotor revolves, the centrifugal force exerted on the catch (and hence on the spring) be greater than the elastic restoring force of the spring whereby to allow the catch to retract and thereby permit free upward or downward motion of the blade.

Torsionally flexible and elastic tie means of any convenient type interconnect sleeve 4 with mast-hub unit 1 and are composed of a steel plug 23 bearing against a shoulder 24 within cylindrical sleeve 4, a central corepiece 25 retained inside the mast-hub unit by screws 26, and stacked metal blades 27 or the like. The stack of blades 27 extends coaxially with blade-supporting arm 2 and is connected to plug 23 and corepiece 25 by means of pins 28. The various bearing points of pivots 6 and 10, which withstand centrifugal force, are made oiltight by suitably located seals and are lubricated by an oil bath by means of a filler cup 29 made of transparent material and positioned above pivot 6, i.e. where the oil level is visible.

Sleeve 4 carries a clevis 30 to which is pivotally connected a pitch control link.

What I claim is:

1. A hollow unit-construction mast-hub assembly for pivotally supporting at its top a helicopter rotor, comprising, in combination, a plurality of hollow cylindrical arms having open extremities; sleeves pivotally and slidably mounted on said extremities, each of said sleeves being adapted to support a rotor blade; a blade attachment clevis connected to each said sleeve, a flapping and lead-lag hinge device being interposed between each of said sleeves and each of said blade attachment clevises; and torsionally flexible tie means being positioned in each of said arms, said tie means being interposed between each of said sleeves and a central corepiece located in said mast-hub so as to be adapted to distribute and balance centrifugal forces developed by the rotor blades.

2. An assembly as claimed in claim 1, including a clevis mounting a lead-lag pivot being supported at the external extremity of each of said sleeves; a flapping pivot traversing said lead-lag pivot at right angles to its axis, the flapping pivot having two ends for supporting one of said blade attachment clevises, said lead-lag pivot mounting clevis including an internal radially slidable catch bearing against an externally positioned radially acting return spring, said catch being adapted to mechanically cooperate with an abutment formed on said lead-lag pivot, whereby said catch retracts through a radial externally oriented sliding motion causing deformation of said spring in response to centrifugal force, thereby facilitating angular deflection of said blade attachment clevis and of the rotor blade associated therewith, for upward and downward motion of the later.